United States Patent [19]
Casarez et al.

[11] Patent Number: 5,913,174
[45] Date of Patent: Jun. 15, 1999

[54] CONNECTORIZED ANTENNA FOR WIRELESS LAN PCMCIA CARD RADIOS

[75] Inventors: Theresa Loney Casarez, San Carlos; James Alfred Stubstad, Jr., Santa Clara; Robin Chu; Mark Edwards, both of San Francisco, all of Calif.

[73] Assignee: Proxim, Inc., Mountain View, Calif.

[21] Appl. No.: 08/666,994

[22] Filed: Jun. 19, 1996

[51] Int. Cl.$^6$ .................................................... H04B 1/38
[52] U.S. Cl. ............................ 455/557; 455/575; 455/90
[58] Field of Search .............................. 455/74, 556, 550, 455/557, 558, 575, 90, 128–129, 267, 347, 351; 343/702; 364/705.01, 705.05

[56] References Cited

U.S. PATENT DOCUMENTS

| | | |
|---|---|---|
| D. 363,700 | 10/1995 | Buongervino et al. ................. D13/147 |
| 5,043,721 | 8/1991 | May . |
| 5,230,088 | 7/1993 | Kramer, Jr. et al. ....................... 455/76 |
| 5,231,699 | 7/1993 | Tendler ...................................... 455/66 |
| 5,378,882 | 1/1995 | Gong et al. .............................. 235/472 |
| 5,418,812 | 5/1995 | Reyes et al. ................................. 375/1 |
| 5,487,182 | 1/1996 | Hansson ................................... 455/90 |
| 5,513,383 | 4/1996 | Tsao ........................................ 455/575 |
| 5,524,284 | 6/1996 | Marcou et al. .......................... 455/129 |
| 5,535,437 | 7/1996 | Karl et al. .................................. 455/90 |
| 5,566,226 | 10/1996 | Mizoguchi et al. ..................... 455/558 |
| 5,628,055 | 5/1997 | Stein ........................................ 455/575 |

OTHER PUBLICATIONS

Lisa L. Sweet, Roaming along the Range Couldn't be Easier Today, PCWEEK, reprinted from Sep. 19, 1994, Ziff–Davis Publishing Company, L.P.

RangeLAN2 7200 PCMCIA, Specifications, 1995 Proxim, Inc.

*Primary Examiner*—Edward F. Urban
*Attorney, Agent, or Firm*—Burns, Doane, Swecker & Mathis LLP

[57] ABSTRACT

A removable connectorized flexible, planar antenna and a removable tethered antenna which attach to a card radio for use in a wireless local area network is disclosed. The planar antenna has a latching mechanism with a pair of release levers which latch to slots in the frame of the card radio to provide an attachment strong enough to be used as an extraction handle for the card radio. The flexible antenna has a flexible sheet with a conductive material applied in a shape specified and connected to the card radio via a RF connection port. A removable tethered antenna is disclosed having at the base of the tethered antenna a dovetailed connector which releasably rotates within a mounting plate affixed to the back of the monitor on a mobile computer.

19 Claims, 14 Drawing Sheets

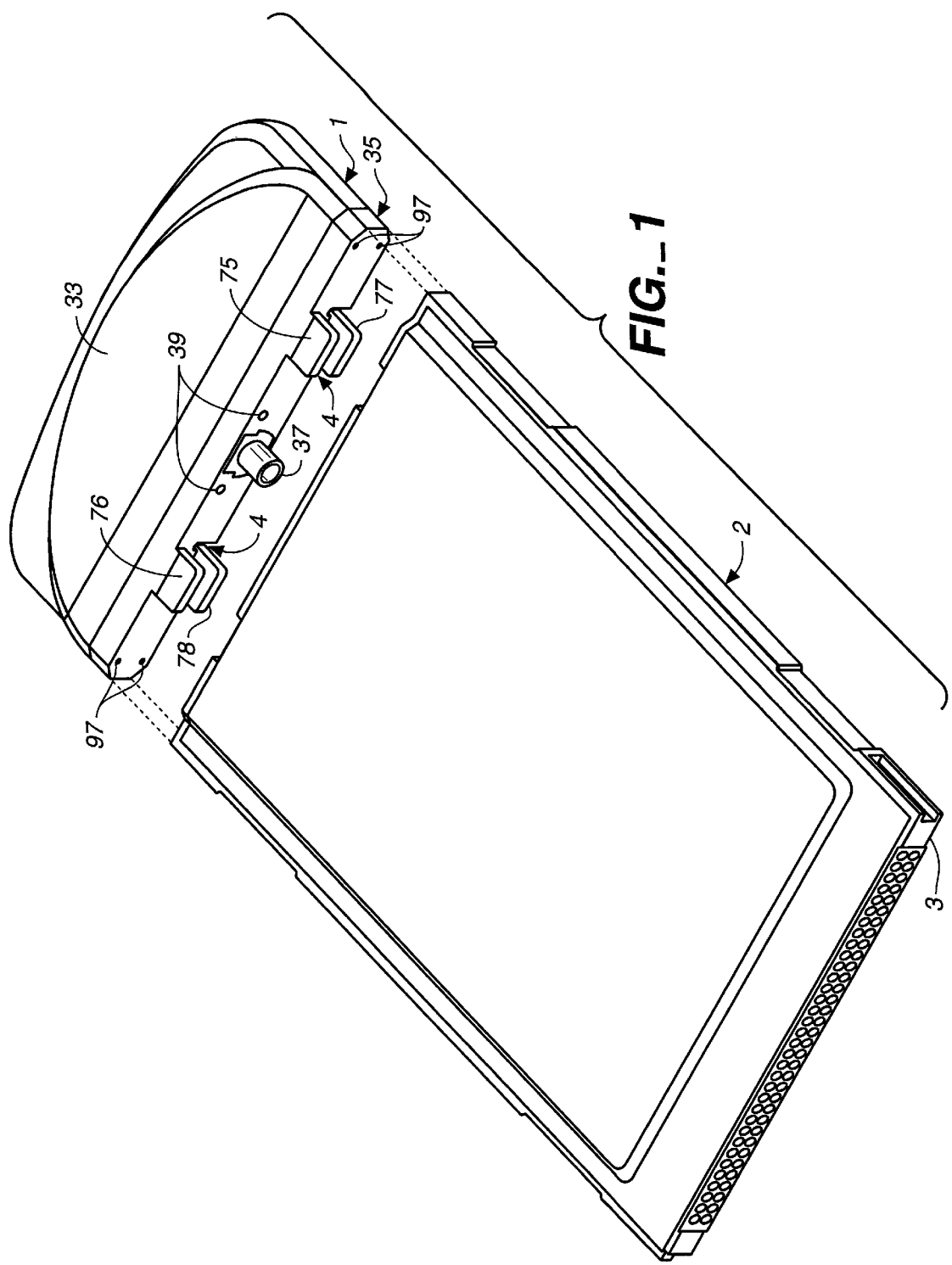
FIG._1

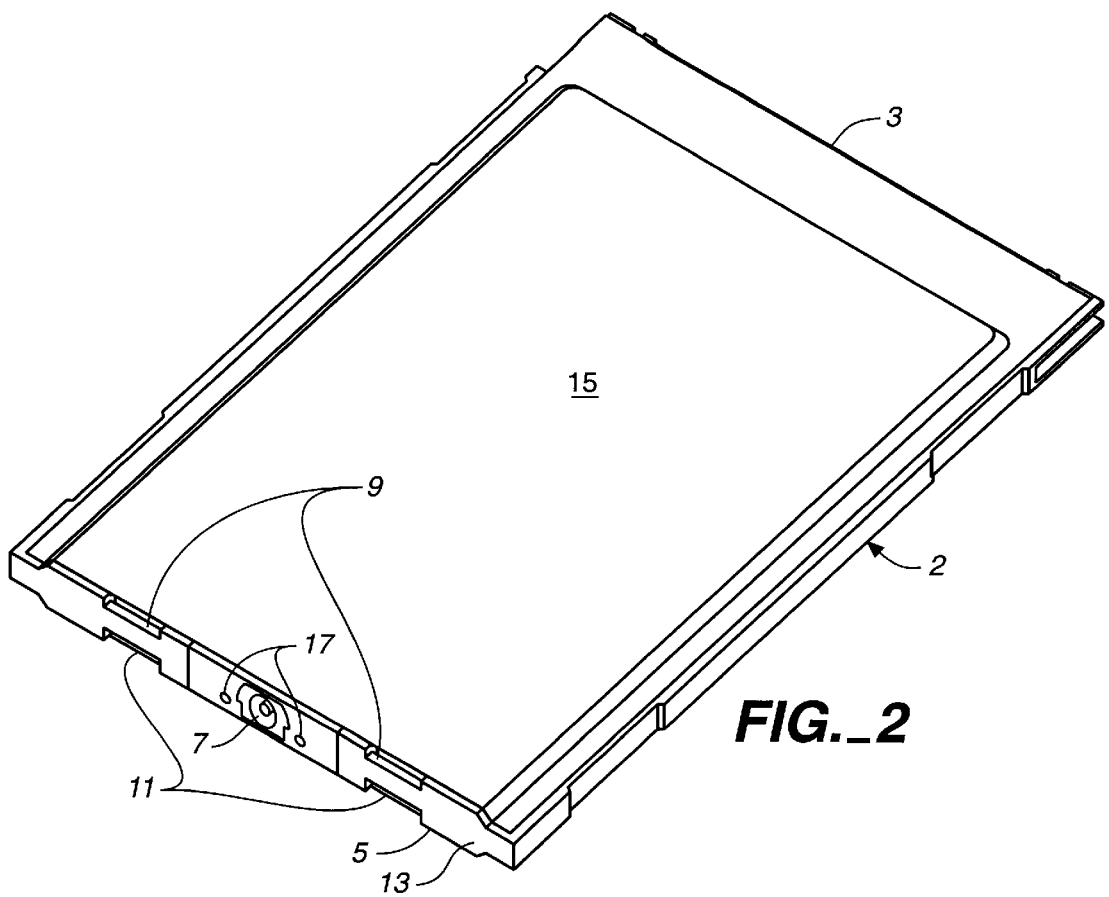
FIG._2
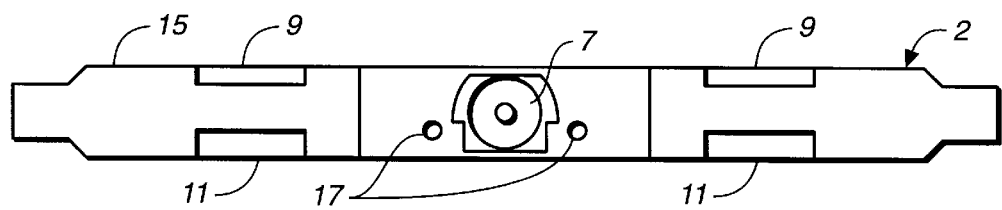
FIG._3

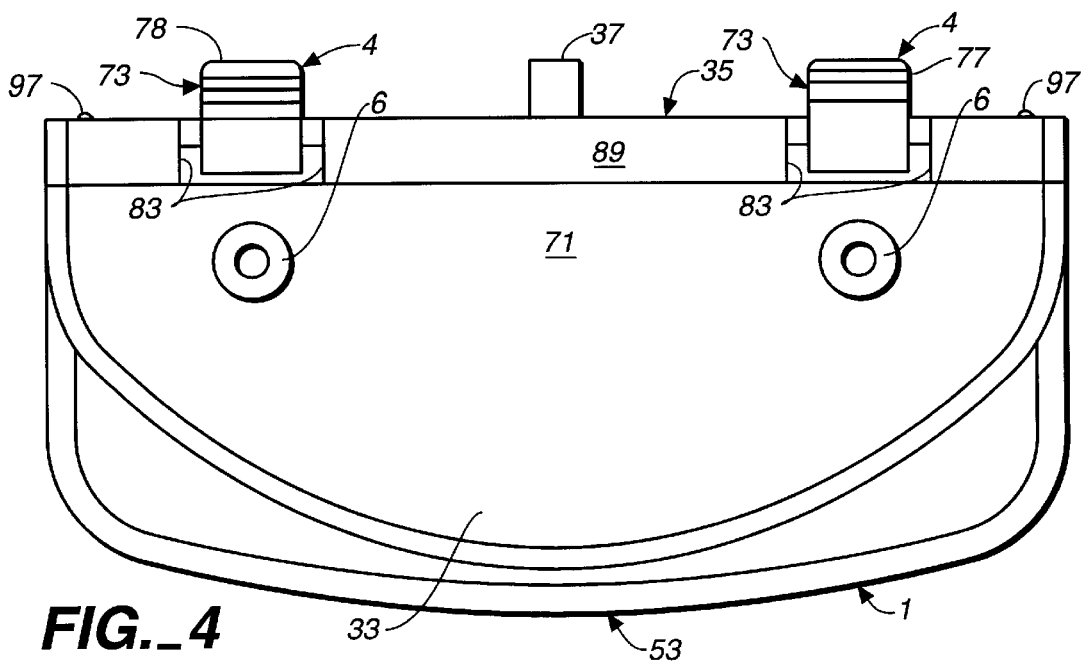
FIG._4
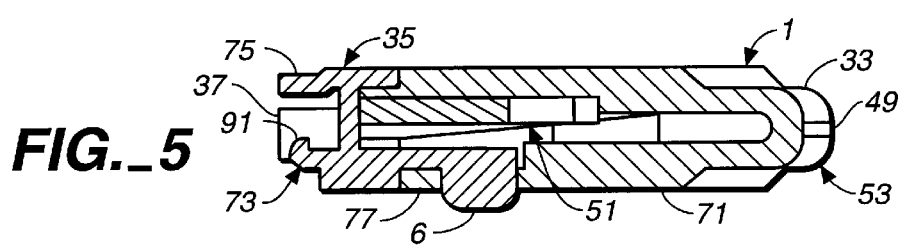
FIG._5
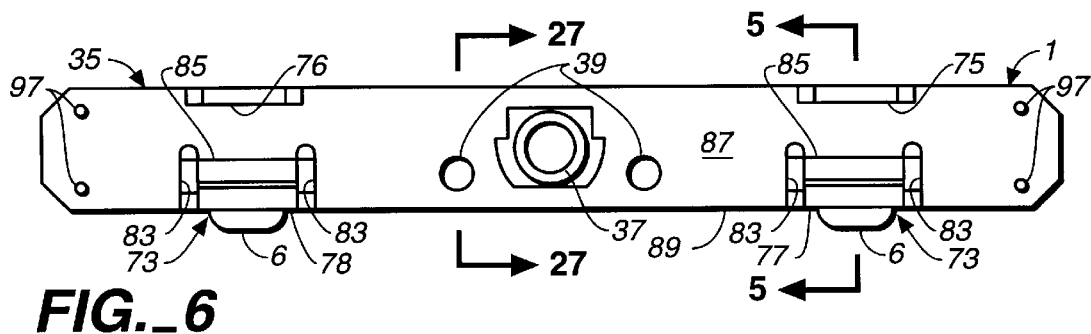
FIG._6
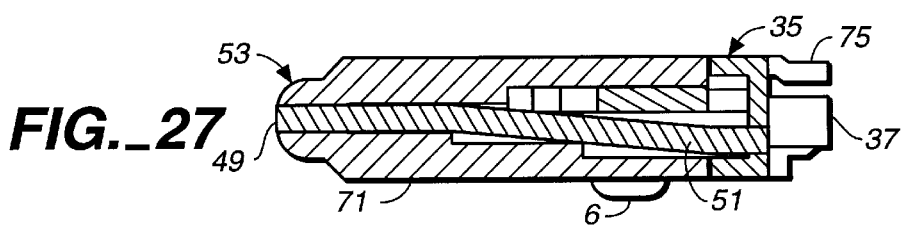
FIG._27

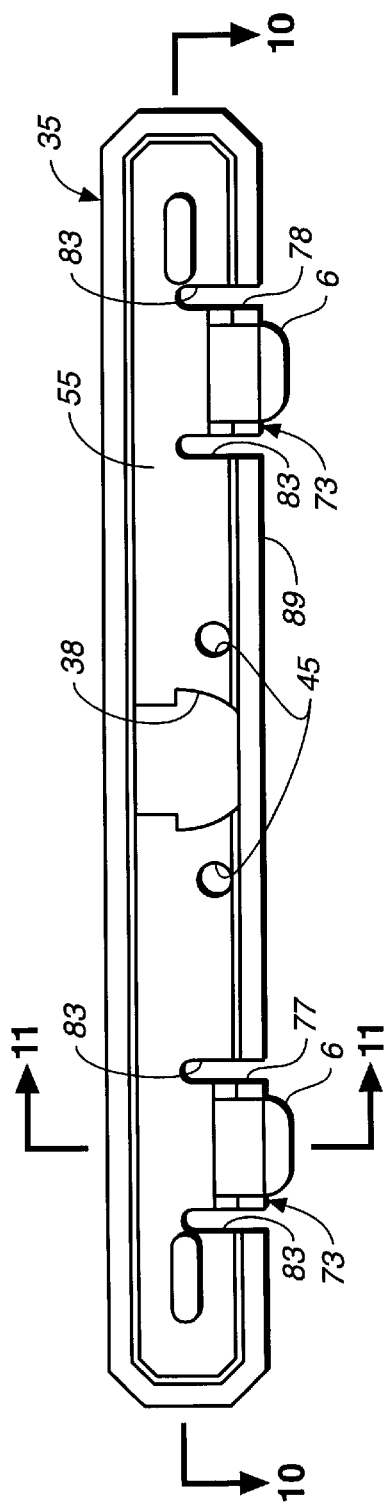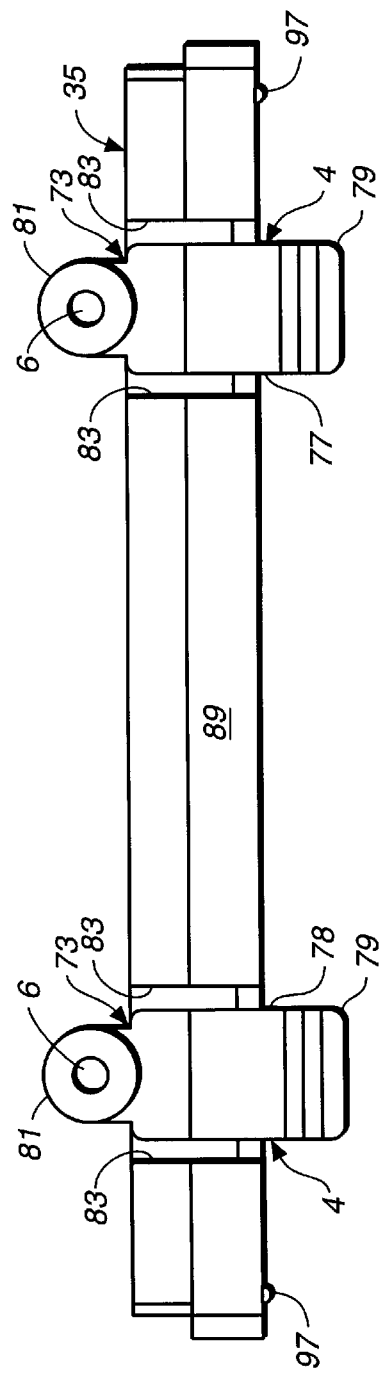

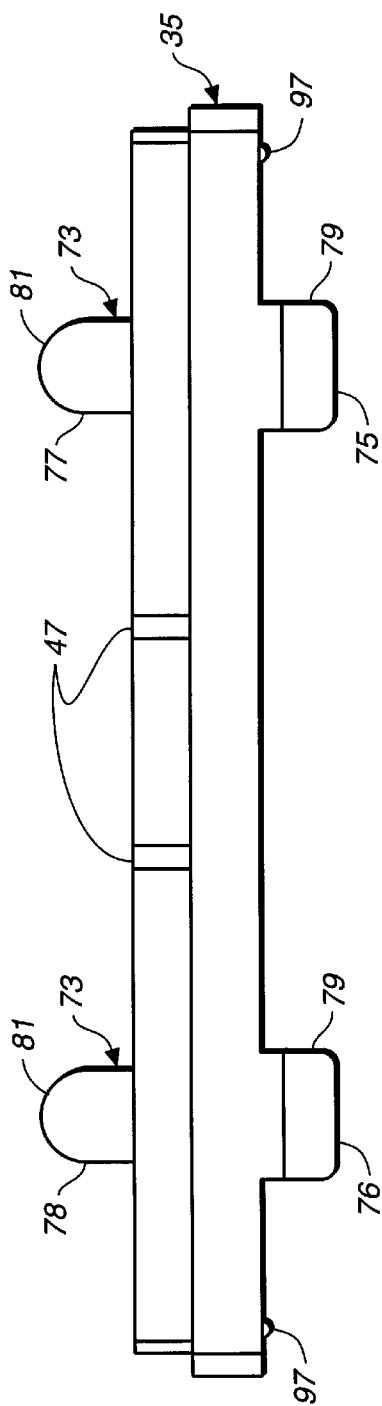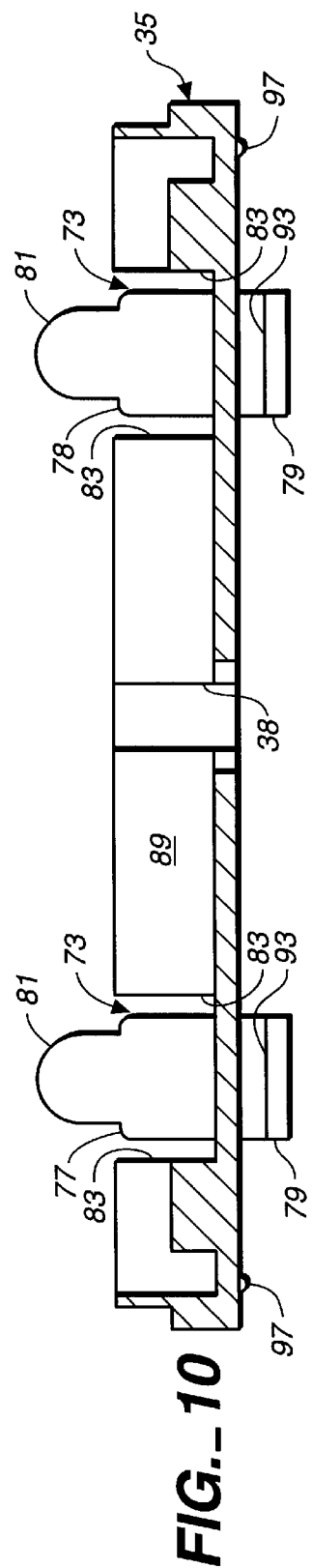

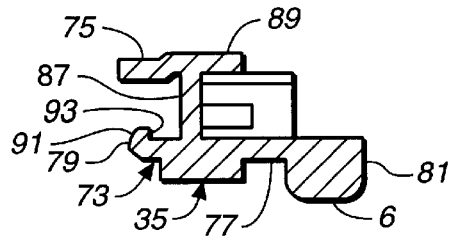
FIG._11
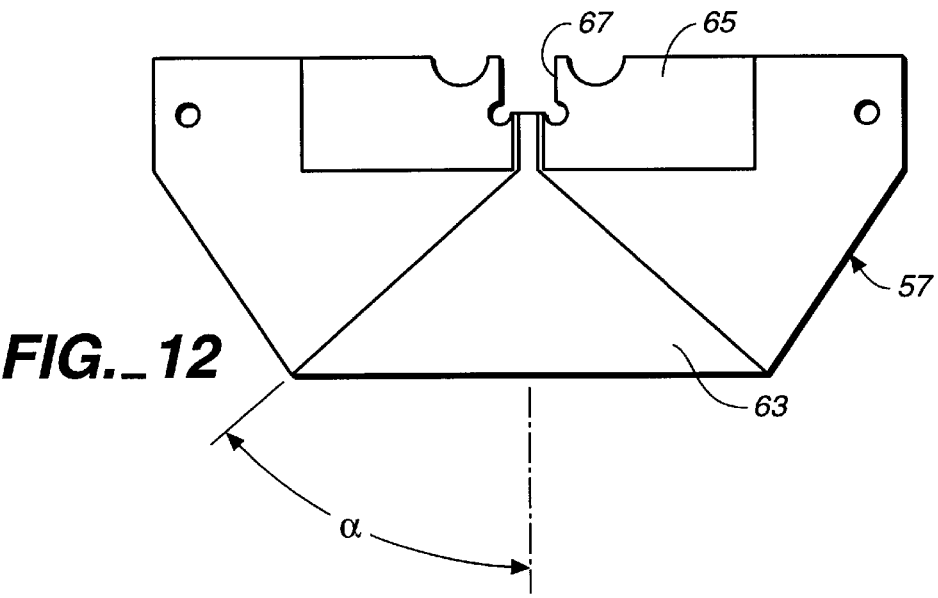
FIG._12
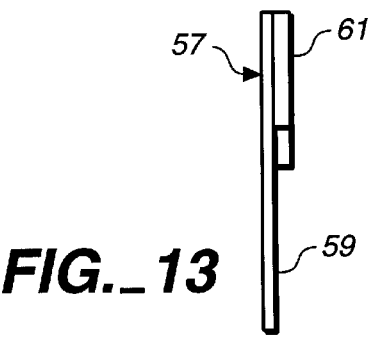
FIG._13
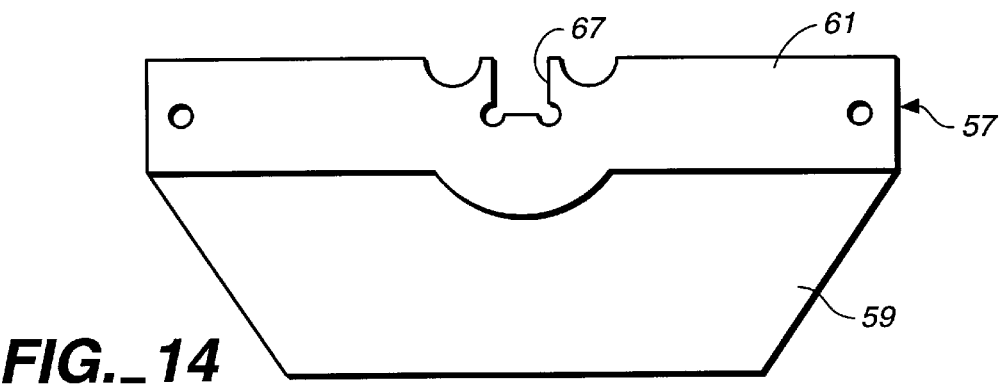
FIG._14

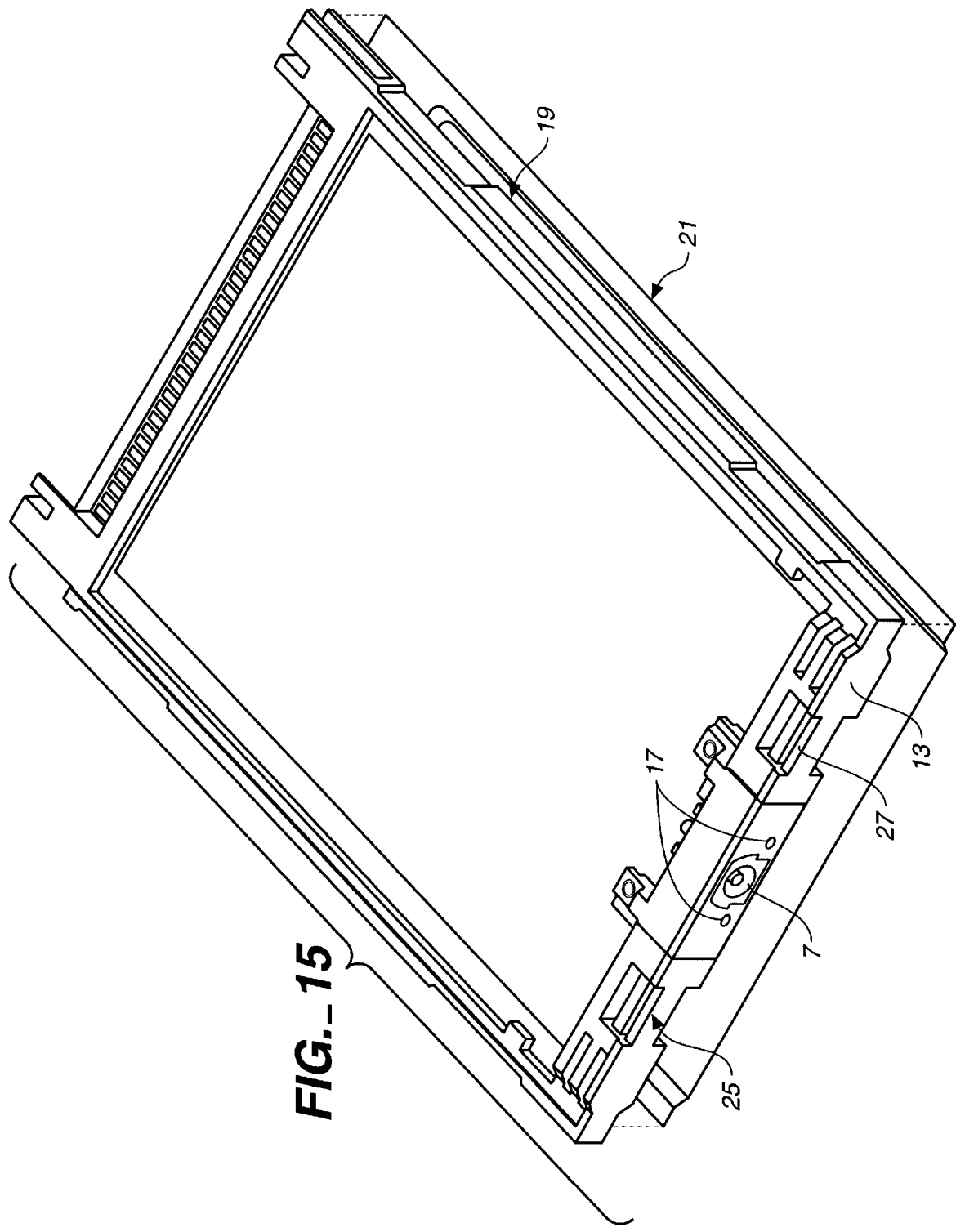

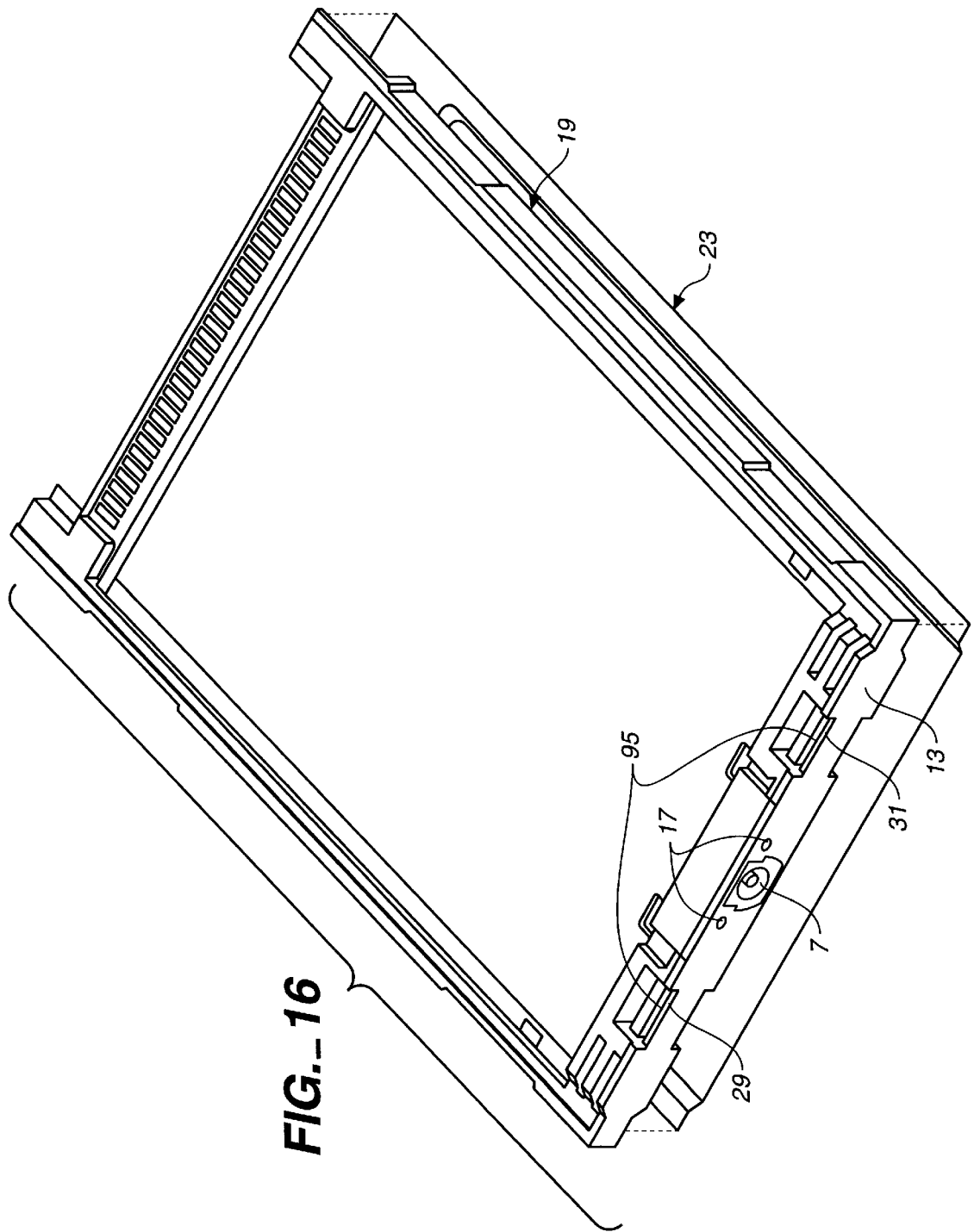

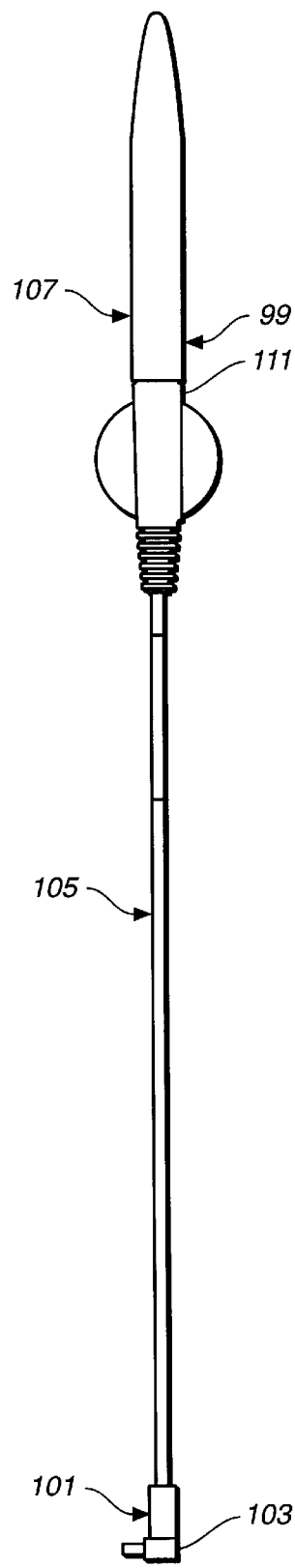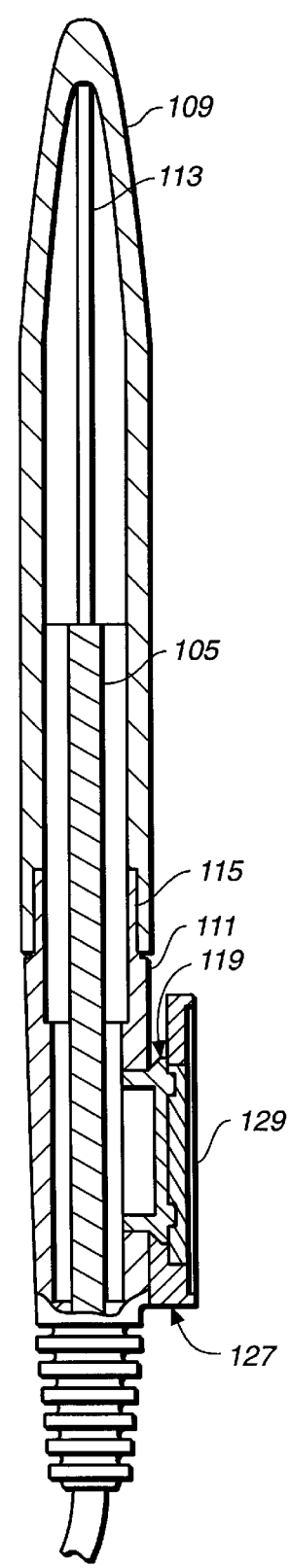
FIG._17  FIG._30

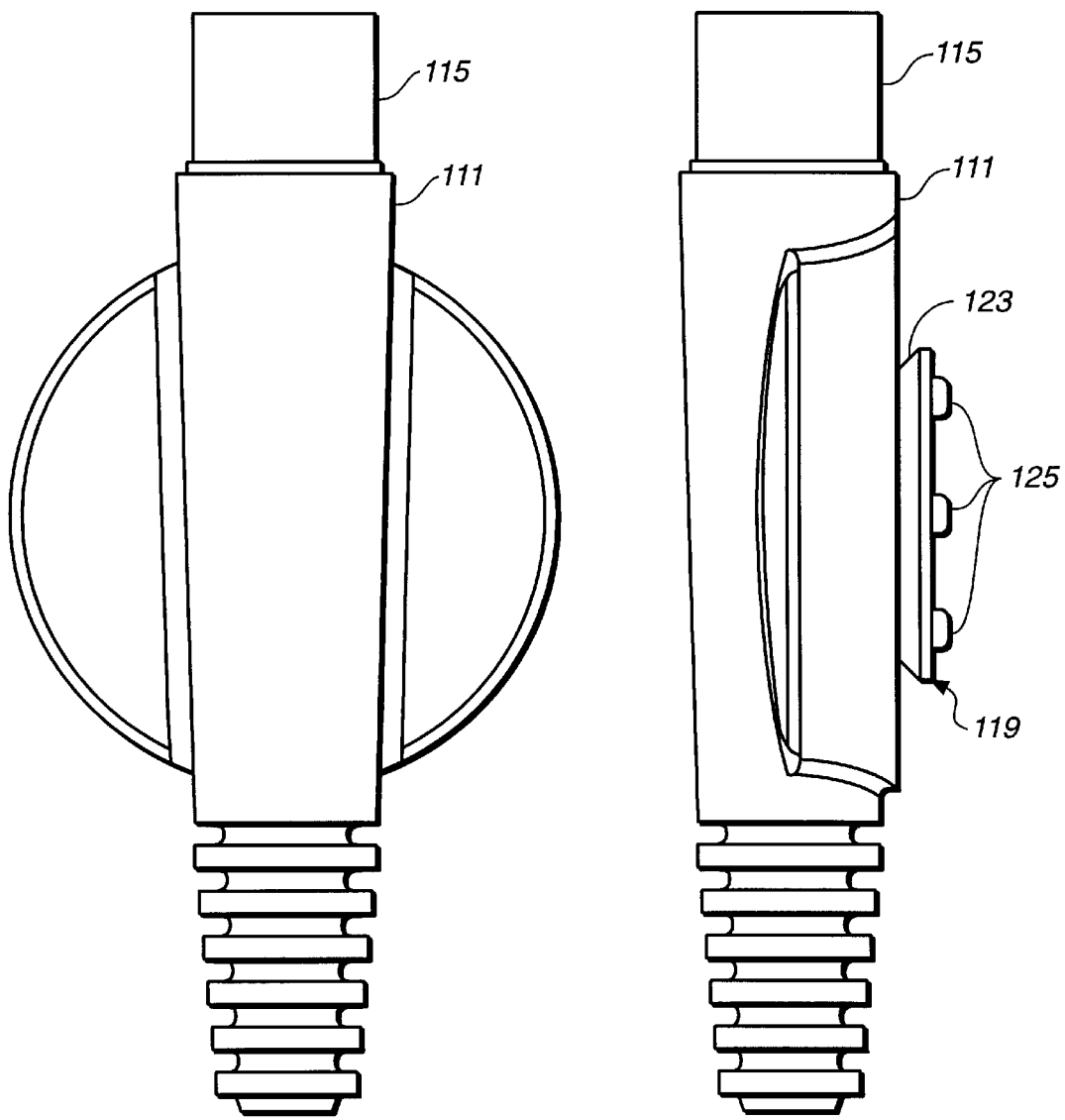
FIG._18  FIG._19

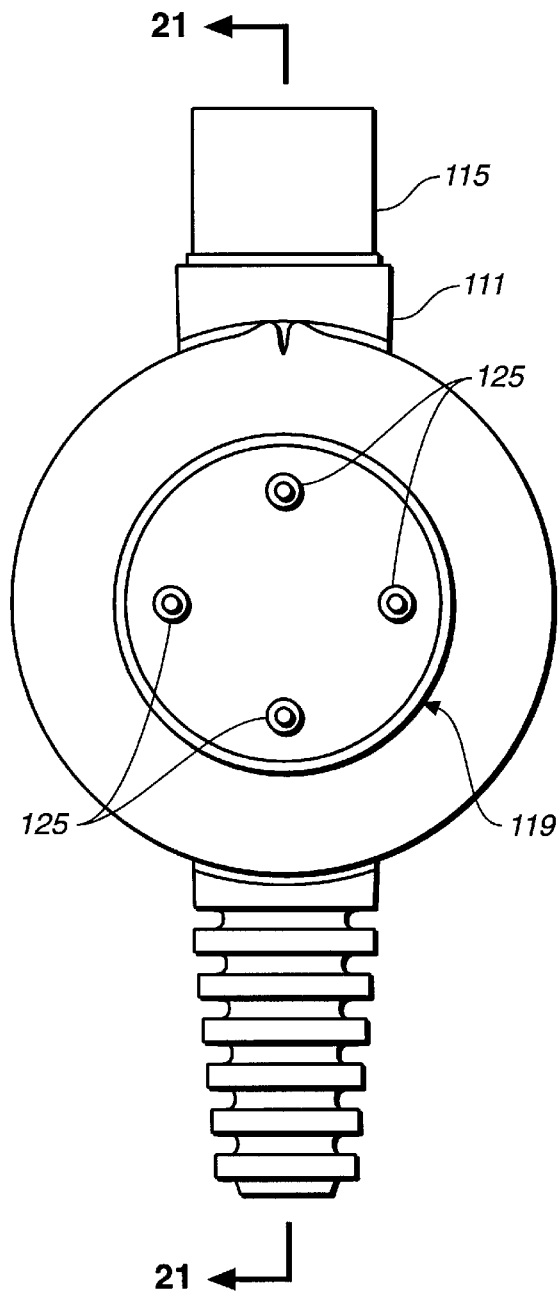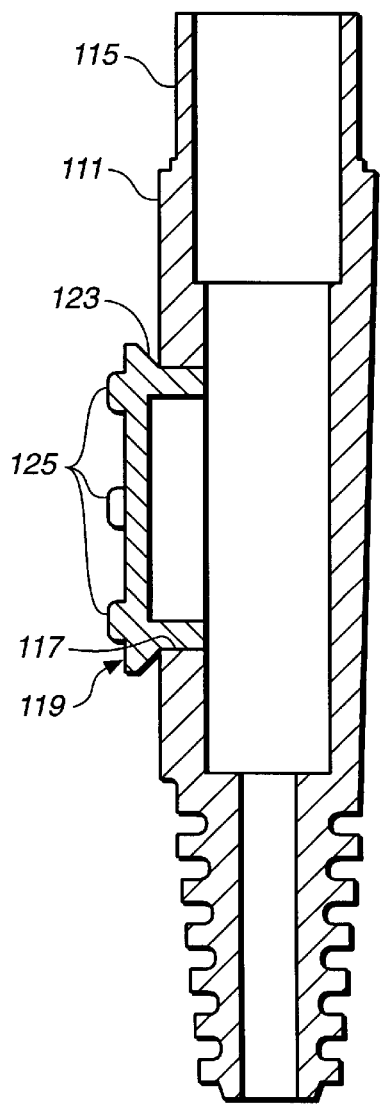
FIG._20    FIG._21

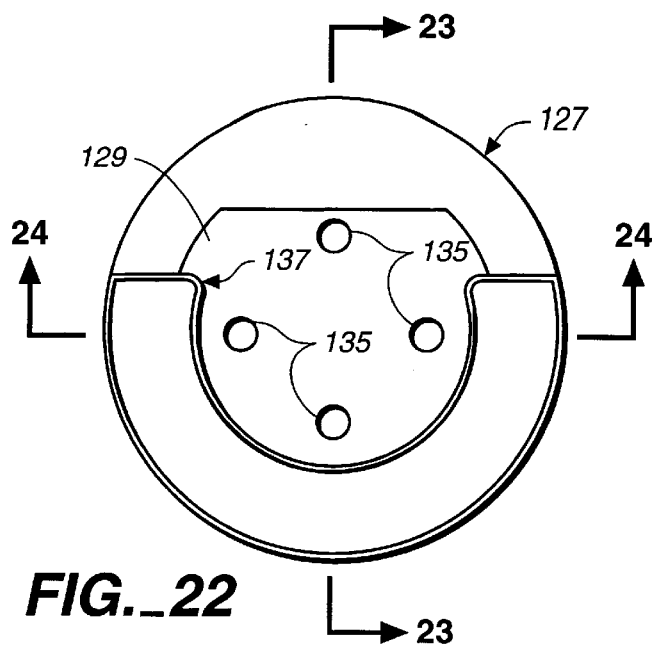
FIG._22
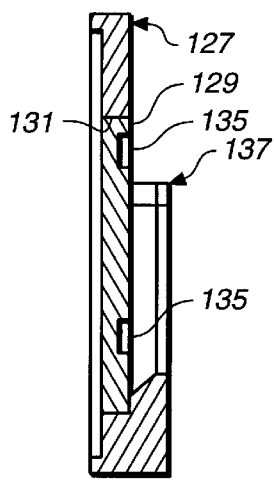
FIG._23
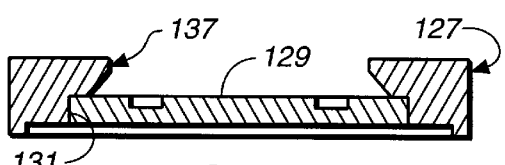
FIG._24
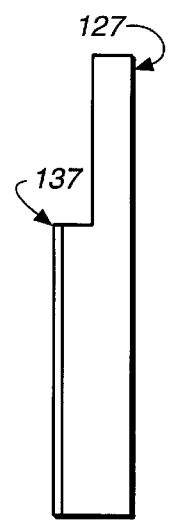
FIG._25
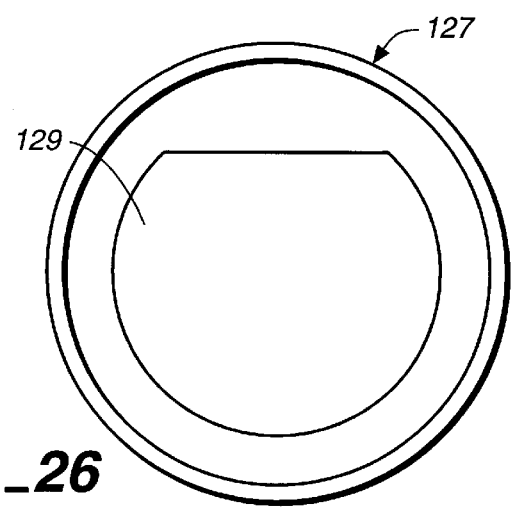
FIG._26

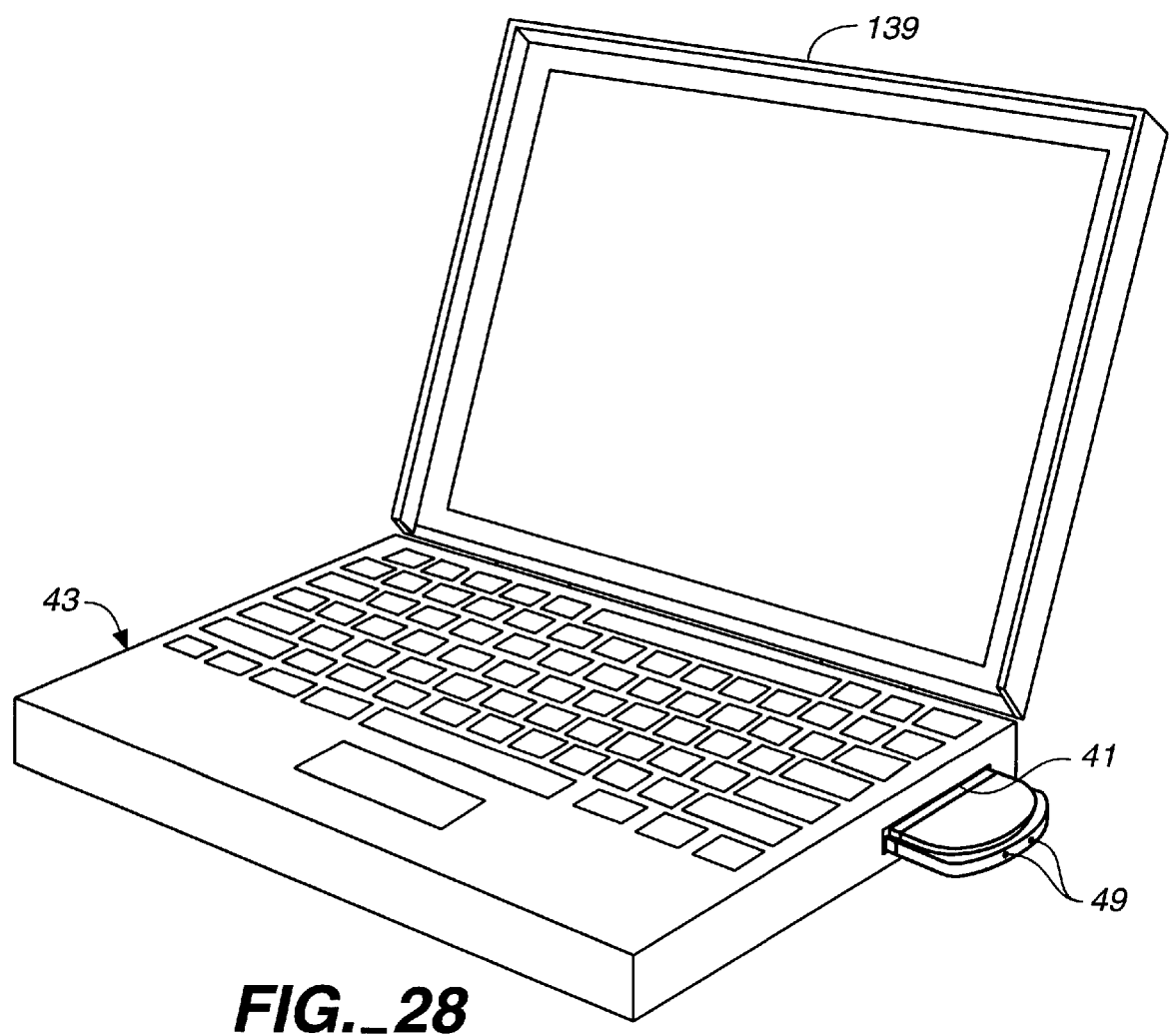
FIG._28

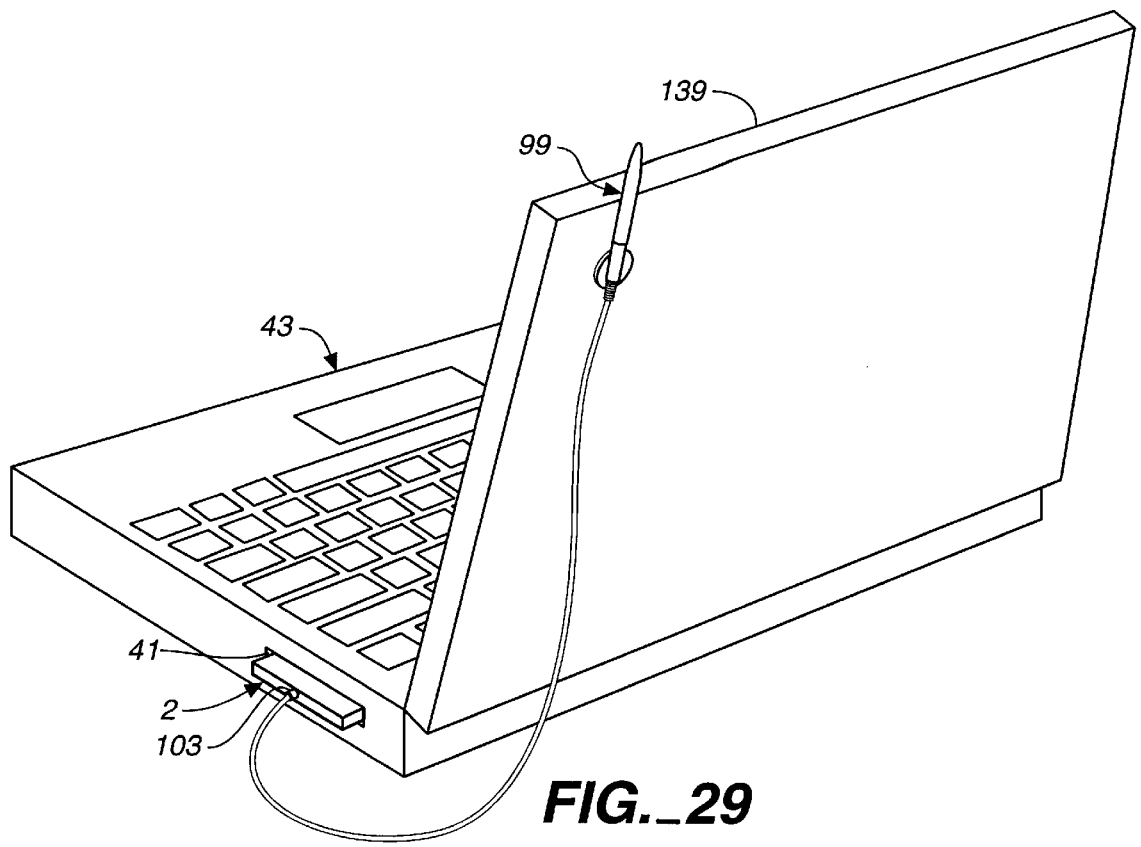
FIG._29
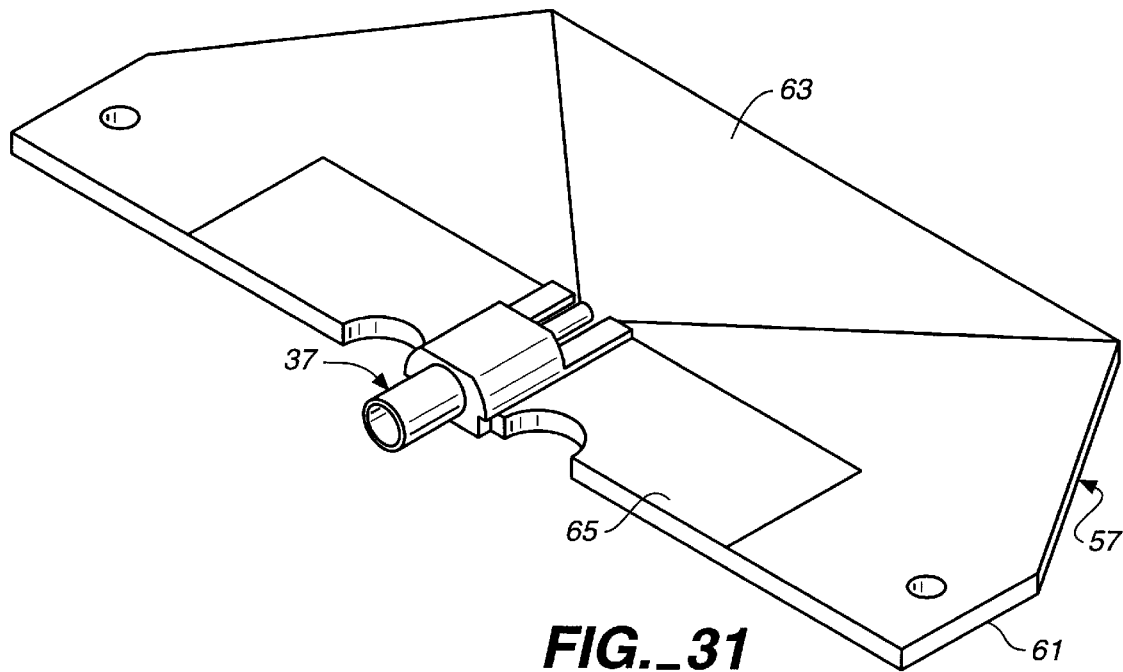
FIG._31

CONNECTORIZED ANTENNA FOR WIRELESS LAN PCMCIA CARD RADIOS

BACKGROUND

1. Field of the Invention

The present invention is generally related to a connectorized antenna system for use with a card radio in providing a communications link for mobile computers in a wireless local area network.

2. State of the Art

The power of computers is no longer defined by their internal parameters such as clock speed or RAM but is increasingly defined by their connectivity, i.e. their ability to communicate with other computers. In many applications, such as hospitals using bedside computers, the only practical option is utilizing mobile computers. While desktop personal computers have the option of communicating through physical networks, mobile computers cannot use such networks. The desired location to work with the mobile computer is often not near a network connection port. Even when a connection port is available the computer is no longer mobile while physically plugged into the network. To provide true connectivity to mobile computers while maintaining their mobility a wireless local area network is used.

A wireless local area network (LAN) is a communication system in which computers or relay stations communicate on radio or microwave frequencies. Each mobile computer in the network has a PCMCIA card radio with a receive/transmit antenna attached. Given the increasing uses of computers online and the explosive growth of internet and intranet computer use the need for a high speed, compact, lightweight, low cost, versatile, portable antenna for use with PCMCIA card radio communications is growing rapidly. Currently available antennas are incapable of meeting the versatility goals and have some drawbacks.

Some of the available antennas are compact but are rigid and permanently attached to the PCMCIA card radio. When using a conventional compact antenna and a PCMCIA card (also commonly referred to as a PC card) that plugs into a port in the computer, such as a PCMCIA Type I, Type II or Type III slot, the antenna protrudes from the PCMCIA card slot. This is a vulnerable position for a rigid antenna, permanently attached to a PCMCIA card antenna making the antenna prone to damage, especially on notebook and smaller computers. Additionally, as the antenna is rigid, force applied to the antenna by a user seeking to extract the PCMCIA card from the computer can easily break the antenna. Accordingly, the present invention seeks to provide a compact flexible antenna that is less prone to damage due to accidental impact and which is strong enough to be used as a handle in extracting a PCMCIA card from the computer.

Some conventional designs utilize a PCMCIA card with an antenna permanently attached to the card and mounted on the mobile computer. There are some drawbacks to such devices. Users who wish a more compact antenna than the antenna provided are stuck with the antenna permanently affixed to the card. Users who wish to have an antenna with the capability of greater reception must settle for the limitations of the permanently affixed antenna. Manufacturers that wish to include a card with their laptop or notebook computer device must choose between providing multiple costly cards with different antennas or only one card and antenna with its attendant drawbacks. Accordingly, the present invention seeks to provide both the user and the manufacturer with the flexibility in choosing the antenna to be used without the substantial cost associated with providing multiple PCMCIA cards.

SUMMARY OF THE PRESENT INVENTION

The present invention provides a removable and/or interchangeable transmit/receive antenna system for a card radio. A connectorized assembly allows the antenna to be connected to the card radio for normal operating use and later to be removed from the card radio providing the flexibility to change antennas to be used with the card radio. In this way, a particular antenna can be used depending on the performance characteristics needed for a given operating environment. In other words, a short antenna attached directly to the end of the card radio can be used or an elongated antenna cabled from the end of the card radio up to the top of a laptop computer display can be used.

In one aspect of the present invention, at least one releasable latch on the antenna mates with an opening on the edge of a PCMCIA card radio to releasably secure the antenna. Mating connector halves on both the PCMCIA card radio and antenna provide the electrical connection between the antenna and the card radio. The releasable latch is manually actuable allowing the user to remove the antenna from the card radio easily when desired.

In another aspect of the present invention, there is a flexible, planar antenna which attaches to a PCMCIA card radio via a releasable latch mechanism on the edge of the antenna. The antenna can be removed from the card by actuating a pair of release levers to release the planar, flexible antenna from the card. A flexible covering, such as a rubber housing, covers the flexible, planar antenna. The construction and materials of the flexible, planar antenna allow the antenna to appear simply as an extension of the PCMCIA card, be strong enough to be used as a handle to extract the PCMCIA card radio from its mating slot in a mobile computer, and be flexible enough so as not to be damaged if bumped or have to be removed from the mobile computer for transport.

In another aspect of the present invention, there is a tethered antenna which connects to a PCMCIA card radio via a connector half on the tether which releasably connects with a mating connector half on the card radio. The antenna is removably attached to a portion of a mobile computer via a dovetail connection with a backplate that is mounted on the mobile computer, allowing the tethered antenna to be removed from the backplate, if desired. For applications with a laptop computer, typically the backplate is mounted on the back side of the flip-up display allowing for high placement of the antenna and the best possible reception.

In a further aspect of the present invention, there is a card radio system, comprising a card radio having an electrical connector and a latch-receiving opening at a distal end and a removable planar antenna having an electrical connector removably connectable with the electrical connector on the distal end of the card radio and an actuable latch releasably mateable with the latch-receiving opening.

In another aspect of the present invention, there is an antenna for use with a card radio, comprising a mounting member having at least one actuable latch to releasably connect the antenna to the card radio, an electrical connector extending through the mounting member, and a planar antenna assembly attached to the mounting member and electrically connected to the electrical connector.

In yet another aspect of the present invention, there is a tethered antenna system for use with a card radio, comprising a mounting plate for attaching to a mobile computer, and a tethered antenna having a base removeably attachable and rotatable in the mounting plate, an elongated antenna element extending from the base, and a cable in electrical communication with the elongated antenna element and extending from a bottom of the base, the cable having an electrical connector at a distal end removably connectable with the electrical connector on the distal end of the card radio.

In still another aspect of the present invention, there is a card radio for use with any of a variety of removable antennae which are connectable with the card radio, comprising a frame assembly having an RF electrical connector which conducts a signal to be radiated by any of the variety of removable antennae and receives a signal collected by any of the variety of removable antennae, and an opening in the frame assembly at a distal end which receives a portion of any of the variety of removable antennae.

BRIEF DESCRIPTION OF THE DRAWING

The present invention can be further understood from the detailed description given herein below and the accompanying drawing wherein:

FIG. 1 is a top perspective view of a planar antenna prior to connection to a PCMCIA card radio according to one embodiment of the present invention;

FIG. 2 is a perspective view of the top of the PCMCIA card radio in accordance with one embodiment of the present invention;

FIG. 3 is a distal end view of the card radio;

FIG. 4 is a bottom plan view of the planar antenna in accordance with one embodiment of the present invention;

FIG. 5 is a cross-sectional view taken along line 5—5 in FIG. 6 of the planar antenna;

FIG. 6 is a front view of the planar antenna of FIG. 4;

FIG. 7 is a rear view of the latch mechanism in accordance with one embodiment of the present invention;

FIG. 8 is a bottom plan view of the latch mechanism of FIG. 7;

FIG. 9 is a top plan view of the latch mechanism of FIG. 7;

FIG. 10 is a cross-sectional view taken along line 10—10 of FIG. 7;

FIG. 11 is a cross-sectional view taken along line 11—11 of FIG. 7;

FIG. 12 is a bottom plan view of a flexible antenna assembly for use in the planar antenna in one embodiment of the present invention;

FIG. 13 is an edge view of the antenna assembly of FIG. 12;

FIG. 14 is a top plan view of the antenna assembly of FIG. 12;

FIG. 15 is a top exploded perspective view of a card radio frame with the top cover and bottom cover of the card radio removed but with the bottom cover shown for reference;

FIG. 16 is an exploded perspective view of the card radio of FIG. 15 in an inverted position with the top cover and bottom cover of the card radio removed but with the top cover shown for reference;

FIG. 17 is a plan view of one embodiment of a tethered antenna in accordance with the present invention;

FIG. 18 is a front elevational view of the base of the tethered antenna in accordance with one embodiment of the present invention;

FIG. 19 is a right side elevational view of the base of the tethered antenna of FIG. 18;

FIG. 20 is a rear elevational view of the base of FIG. 18;

FIG. 21 is a cross-sectional view of the antenna base taken along line 21—21 of FIG. 20;

FIG. 22 is a front elevational view of a semi-circular dovetail connector in accordance with one embodiment of the present invention;

FIG. 23 is a cross-sectional view of the semi-circular dovetail connector taken along line 23—23 of FIG. 22;

FIG. 24 is a cross-sectional view of the semi-circular dovetail connector taken along line 24—24 of FIG. 22;

FIG. 25 is a right side elevational view of the semi-circular dovetail connector of FIG. 22;

FIG. 26 is a rear elevational view of the semi-circular dovetail connector of FIG. 22;

FIG. 27 is a cross-sectional view taken along line 27—27 of FIG. 6;

FIG. 28 is a perspective view of a mobile computer with a card radio having a removable planar antenna attached thereto;

FIG. 29 is a perspective view of a mobile computer with a card radio having a tethered antenna attached thereto;

FIG. 30 is a cross-sectional view of a tethered antenna in accordance with one embodiment of the present invention; and FIG. 31 is a perspective view of the antenna assembly of FIGS. 12–14 with an RF electrical connector assembled therewith.

DETAILED DESCRIPTION OF THE INVENTION

The present invention provides a card radio 2 having a removable, interchangeable receive/transmit antenna 1 and/or 99. The removable, interchangeable receive/transmit antenna is referred to herein as "connectorized" because the antenna is connected to the card radio with mating electrical connectors. In one aspect, the removable, receive/transmit antenna is a relatively short, flexible, planar antenna 1 (FIG. 1) comprised of a mounting member 35, flexible antenna assembly and flexible outer housing 33. In another aspect, the removable antenna is an elongated, cylindrical, receive/transmit antenna 99 (FIG. 17) with a cable 105 and electrical connector 103 attached to the proximal end of the elongated, cylindrical antenna. The elongated, cylindrical antenna is comprised of a flexible elongated antenna element 113 (FIG. 30) located within an elongated flexible housing 109 attached to a base 111. The base of the elongated antenna can be removably connected with a mounting plate 127. The mounting plate being located in a desired position on a mobile computer. The base and mounting plate are configured so as to allow the elongated antenna to be rotated to a desired position for use or storage.

Referring initially to FIGS. 1–3, there is shown relatively short, planar, removable receive/transmit antenna 1, according to one embodiment of the present invention, prior to connecting with a card radio 2. The card radio 2, shown in the figures is a PCMCIA Type II card but it is within the scope of the invention to use a PCMCIA Type I or Type III card as well. Likewise, it is within the scope of the invention that the card radio can be any of a variety of removable radios that are not restricted to the PCMCIA standard specifications. The card radio shown in the figures plugs into a PCMCIA Type II slot 41 on a mobile computer 43 (FIG. 28) such as, but not limited to, a laptop notebook, sub-notebook, palm-top, personal digital assistant, etc. The card radio 2 operates in the about 2.4 to about 2.5 gigahertz band, more preferably in the about 2.4 to 2.4835 gigahertz band.

In a preferred embodiment, the card radio is a frequency hopping spread spectrum radio. The card radio has 15 channels operating at a data rate of 1.6 Mbps per channel. The typical operating distance is 500 feet in normal office environments and up to 1000 feet in open spaces. The card radio has a typical average power output of 100 milliwatts. The card radio has a standard 68 hole mating connector at proximal end 3 which mates with a 68 pin mating connector in a PCMCIA card slot 41 in a mobile computer 43.

In one embodiment, removable planar antenna 1 (FIGS. 1, 4–6 and 27) comprises a flexible outer housing 33 (e.g., rubber) attached to a mounting member 35 (FIGS. 7–11). Attached to inner surface 38 and protruding through mounting member 35 is male RF coaxial connector 37 located roughly along the center line of the planar antenna for mating with the female RF coaxial connector 7 of the card radio 2. Preferably, the RF coaxial connector is a single feed in/out connection. It will be appreciated by one of ordinary skill in the art that the female RF coaxial connector can be associated with the planar antenna and the male RF coaxial connector can be associated with the card radio. Planar antenna 1 is generally the same width and thickness as the PCMCIA card radio 2. For a Type II PCMCIA card, for example, the planar antenna is 0.20 inches thick and 1.88 inches wide. The planar antenna preferably is as short as possible without limiting the electrical performance too severely. In one embodiment, the antenna 1 is 0.89 inches long.

As can be seen in FIGS. 2 and 3, the card radio 2 has at distal end 5 a female RF coaxial mating connector 7 located approximately along the center line of the card radio for mating with the male RF coaxial connector 37 of the planar antenna 1. Also located at the distal end 5 of the card radio 2 are two openings or receiving slots 9 and two larger openings or receiving slots 11 cut into the front face 13 of the card radio frame. Openings 9 are located on the top edge of the face 13 and larger openings 11 are located along the bottom edge of face 13. Also located on face 13 are light emitting elements 17 located on either side of the RF female coaxial connector 7. Light emitting elements 17 will be described in more detail below.

Referring now to FIGS. 15 and 16, there is shown a modified PCMCIA card frame for use with the present invention. FIG. 15 shows the card frame 19 in a normal upright position with the top cover plate and bottom cover plate removed (but with the bottom cover plate 21 shown for reference). FIG. 16 shows the card frame 19 in an inverted position with top cover 23 shown for reference. FIG. 15 shows slots 25, 27 cut into the card frame 19 for receiving part of the latch mechanism of the planar antenna 1 to be described in more detail below. FIG. 16 shows slots 29 and 31 cut into the card frame 19 for receiving part of the latch mechanism of the planar antenna as will be described in more detail.

A latch mechanism assembly 4 is used to releasably connect the removable planar antenna 1 to the card radio 2 (FIG. 1). The connection provided by the latch mechanism 4 is strong enough to allow the planar antenna 1 to be used as a handle for extracting the card radio 2 from its host computer. Release levers 6 projecting through openings in the outer housing 33 on the underneath side 71 of the planar antenna 1, when depressed, release the latch mechanism so that the planar antenna 1 can be removed from the card radio 2.

In one embodiment, latch mechanism assembly 4 is comprised of a pair of latch assemblies 73 (FIGS. 1, 4–11 and 27). Each latch assembly 73 is integrally formed with mounting member 35. Each latch assembly has a stationary alignment member 75,76 and a pivoting lever 77,78. As the planar antenna 1 is brought into proximity of the distal end 5 of the card radio 2, stationary alignment member 75 is inserted through one of the receiving slots 9 in front face 13 of the card radio and seated in slot 25 in card frame 19. Likewise, stationary alignment member 76 is inserted through the other receiving slot 9 in front face 13 of the card radio and seated in slot 27 in card frame 19. Correspondingly, pivoting lever 77 is inserted through one of the receiving slots 11 in front face 13 of the card radio and latched into slot 31 in card frame 19 and pivoting lever 78 is inserted through the other receiving slot 11 of the card radio and latched into slot 29 in card frame 19. As pivoting levers 77,78 are pushed into corresponding slots 31,29, their corresponding latch ends 79 are displaced upward and their corresponding release ends 81 are displaced downward as camming surface 91 passes over the leading edge of each of the slots in the card frame. After the latch ends have been fully inserted into their corresponding slots, the pivoting levers 77,78 resiliently resume their initial orientation and retaining surfaces 93 hold the planar antenna 1 to the card radio 2 as they latch over edges 95 in slots 31,29, respectively. Protrusions 97 can be provided on the front wall 87 of the mounting member 35 to take out any "slack" that might exist between the retaining surfaces 93 and the inner surface of the card frame to which they contact.

As can best be seen in FIGS. 10 and 11, each pivoting lever 77,78 is pivotally connected to the mounting member 35 at a location closer to the latch end 79 of the lever having a hook thereon than the release end 81 of each lever. Each lever 77,78 pivots about a fulcrum 85 created in the mounting member 35 by grooves 83 formed through front wall 87 and bottom wall 89 of the mounting member 35. Each lever 77,78 allows a user to spread latch ends 79 away from the stationary alignment members 75,76 of the latch assemblies 73 and release the planar antenna 1 from the card radio by depressing the release levers 6. When the release levers 6 are depressed, latch ends 79 are displaced and retaining surfaces 93 are raised above edges 95 of the card frame 19, then the antenna 1 can be withdrawn from the card radio.

In one embodiment, the removable planar antenna 1 has located within the soft flexible cover 33 and attached to an inner surface 55 of the mounting member 35 a flexible antenna assembly 57 shown in FIGS. 12–14 and 31. Flexible antenna assembly 57 is comprised of a flexible substrate 59 laminated to a rigid member 61. The substrate 59 is made of a strong flexible construction, such as, copper clad polyimide to resist damage if it is twisted or bent. Laminated to the flexible substrate 59 is a flexible conductor (e.g., copper) 63 with a ground strip (or plane) 65. Male RF coaxial connector 37 is soldered into gap 67 in the rigid member 61 and soldered to the conductor 63 at the center conductor of the coaxial connector (FIG. 31). The flexible conductor 63, shown in FIGS. 12–14 and 31, is a conical monopole configuration. The conical structure of the conductor 63 increases the bandwidth of the antenna and generally requires little to no tuning after manufacture. The flare angle ∞ of the conductor 63 is preferably in the range of about 20 degrees to about 60 degrees, more preferably about 45 degrees so as to achieve a good impedance match with the card radio for best energy transfer. In other words, the conical monopole reduces tuning critically relative to a monopole of constant cross-section, for example, for a given length on a card radio antenna. A conical monopole radiator on a planar antenna reduces the overall length of the antenna while preserving efficiency and increasing bandwidth. Another advantage of the conical monopole radiator with a ground strip is that tuning is decoupled from the particular platform (i.e., laptop, notebook, sub-notebook, palm top, personal digital assistant, etc.) in which the card radio is used. In other words, the antenna is less apt to be detuned when changed from one platform to another. It will be appreciated by one of ordinary skill in the art that the pattern of the flexible conductor 63 can be any of a variety of patterns selected to produce different propagation patterns in signals sent by the antenna and different reception characteristics of received signals.

Ground strip 65 is connected to the ground shell of the coaxial connector 37. Ground strip 65 is optional but is advantageous for several reasons. The ground strip assists in defining the environment around the antenna. The most intense currents of the system are generally near the base of the conical element. By using the ground strip, the large currents are induced to flow on the ground strip which is controlled thus reducing the currents that would flow on the card radio, the mobile computer, or other structures in the area. The ground strip increases the performance of the card radio and generates a more predictable pattern of operation. Furthermore, it allows the card radio to be used in a variety of mobile computers regardless of the electrical characteristics of those mobile computers.

In one embodiment, on either side of the female coaxial connector 37 are light receiving elements 39 located in openings 45 in the mounting member 35. Light receiving elements 39 are the terminations of light conducting elements 51 (e.g., 1.6 millimeter diameter acrylic fiber optic strands) which are aligned with light emitting elements 17 of the card radio 2 when the planar antenna 1 is attached to the card radio 2. In one embodiment, light conducting elements 51 are located in channels 47 to maintain alignment. As can best be seen in FIGS. 27 and 28, the light conducting elements 51 extend the length of the interior of the planar antenna 1 and terminate as light emitting elements 49 through openings in the outer housing 33 at the distal end 53 of the antenna 1. Accordingly, located within card radio 2, preferably on the "short side" (i.e., the bottom) of the card are two "right angle" light emitting diodes (not shown), such as green and orange, and light conducting elements (i.e., fiber optic strands) (not shown) that begin adjacent to the light emitting diodes and terminate as light emitting elements 17 in the face of the card radio. With the combined light emitting and conducting assemblies of the card radio 2 and antenna 1, the transmit and receive functions of the card radio can be observed through the illumination (e.g., "flickering") of the light emitting elements 49 at the distal end of planar antenna 1.

In another embodiment, a removable tethered antenna 99 is shown in FIGS. 29 and 17 for interchanging with the removable planar antenna 1. Removable tethered antenna 99 releasably connects at the proximal end 101 to the card radio 2 via a connector 103 (e.g., an RF right angle, coaxial connector). Cable 105 connects the elongated antenna assembly 107 to the connector 103. Cable 105 is typically a coaxial cable of sufficient length (e.g., 12 inches) to reach easily from a card radio located in a PCMCIA card slot 41 in a laptop mobile computer 43 to the top portion of the computer monitor 139 when the monitor is in a full upright position (FIG. 29).

As can best be seen in FIG. 30, elongated antenna assembly 107 is comprised of a flexible antenna housing 109 (e.g., rubber) connected to base member 111 to protect flexible conductive elongated antenna element 113. In one embodiment, the antenna element 113 is formed by stripping away the outer insulation and shield of a coaxial cable, exposing a specific length of dielectric and center conductor of the coaxial cable 105. The outer insulation is removed, as well as a portion of the shield. The prepared cable end is threaded through a metallic tubular sleeve of a specific length. The top of the tubular sleeve is positioned at the point on the prepared cable end where the outer insulation and shield have been removed. The remaining portion of the shield is electrically and mechanically attached to the top of the tubular sleeve. The antenna housing 109 is connected to portion 115 of the base member 111 in a manner (e.g., adhesive) strong enough to withstand normal use and abuse associated with use of a mobile computer. In one embodiment, there is an opening 117 through base member 111 (FIG. 21) for receiving dovetail flange member 119. Dovetail flange member 119 is ultrasonically welded into the opening 117. It will be appreciated by one of ordinary skill in the art that other methods of attachment can be used, such as but not limited to adhesive, friction press fit, or be integrally formed as part of the base member 111.

In one embodiment, the dovetail flange member 119 has a circular flange portion 123 and indexing elements 125 which interface with semi-circular dovetail mating member 127 (FIGS. 22–26) and backplate member 129 (FIGS. 22–24 and 26). Typically, the base member 111, dovetail flange member 119, semi-circular dovetail mating member 127, and backplate member 129 are formed from a sturdy plastic material. In one embodiment, there is an opening 131 through dovetail mating member 127 (FIGS. 23 and 24) for receiving backplate member 129. Backplate member 129 is ultrasonically welded into the opening 131. It will be appreciated by one of ordinary skill in the art that other methods of attachment can be used, such as but not limited to adhesive, friction press fit, or be integrally formed as part of the dovetail mating member 127. After backplate member 129 has been attached in semi-circular dovetail mating member 127, indentations 135 are visible through semi-circular overhang portion 137 of dovetail mating member 127. The semi-circular dovetail assembly comprised of backplate member 129 and semi-circular dovetail mating member 127 is typically permanently mounted at a desired location on a mobile computer. For example as shown in FIG. 29, the assembly is attached with adhesive or double-side adhesive tape to the upper portion of the backside of the flip-up monitor 139 of the mobile computer 43.

When a user wishes to use the tethered antenna 99 to communicate with the LAN, card radio 2 is installed in the appropriate port on the user's mobile computer and the connector 103 is connected to the corresponding mating connector 7 in the card radio. The tethered antenna 99 is mounted on the backside of the flip-up monitor 139 by sliding circular flange portion 123 of the dovetail flange member 119 into the backplate member 129 under the semi-circular dovetail overhang portion 137 (FIG. 30). The inside surface of the overhang portion 137 is sloped to match the circular flange portion 123. Because the dove-tail flange members 119 and 127 are circular and semi-circular, respectively, the removable tethered antenna 99 can be inserted into the semi-circular dovetail assembly in any orientation. The indexing elements 125 on the flange member 119 interface with the indentations 135 in the backplate member 129 to releasably retain the tethered antenna in an upright position or rotated 90 or 180 degrees from the upright position. As will be appreciated by one of ordinary skill in the art, any number of indentations can be provided at any of a variety of positions in the backplate member to orient the antenna into any of a number of desired positions, thus locking the tethered antenna 99 into position and preventing it from rotating. Typically, the indentations are spaced 90 degrees apart such that the tethered antenna 99 can be rotated between an upright in use position and a horizontal storage position. The tethered antenna of the present invention does not need to be removed for transport of the mobile computer but rather can be positioned in the horizontal position by simply rotating the antenna within the semi-circular dovetail assembly. When a user applies force to the antenna to rotate it between the upright and horizontal positions, the indexing elements are popped out of the indentations and slide easily across the surface of the backplate member allowing the antenna to rotate freely. In another embodiment, the semi-circular dovetail assembly is integrally formed into the back of the flip up monitor of the mobile computer.

In one embodiment, the tethered antenna operates in the about 2.4 to about 2.5 gigahertz band, more preferably in the about 2.4 to 2.4835 gigahertz band. The typical operating distance for the tethered antenna is 500 feet in normal office environments and up to 1000 feet in open spaces. The tethered antenna typically has a power rating of 10 watts and an impedance of 50 ohms nominal.

As can be seen from the foregoing discussion and the embodiments described the connectorized approach to the attachment of an antenna to a card radio allows considerable flexibility for both the computer user and the computer manufacturer. With a releasable latching mechanism between the antenna and the card radio, antennas can be chosen either for maximum compactness and durability or for maximum transmission/reception. The connectorized approach to card radio antennas allows the matching of the performance of an antenna to an application without the cost and inconvenience of having multiple card radios. Thus, one card radio can provide communication to a variety of different types of computers in a variety of different applications by merely changing the antenna connected to the card radio.

The foregoing has described the principles, preferred embodiments and modes of operation of the present invention. However, the invention should not be construed as being limited to the particular embodiments discussed and the above-described embodiments should be regarded as illustrative rather than restrictive, and it should be appreciated that variations may be made in those embodiments by workers skilled in the art without departing from the scope of the present invention as defined by the following claims.

What is claimed is:

1. A card radio system comprising:
a card radio having an electrical connector and a latch-receiving opening at a distal end;
a removable flexible planar antenna having an electrical connector removably connectable with the electrical connector on the distal end of the card radio and an actuable latch releasably mateable with the latch-receiving opening, wherein the planar antenna comprises a mounting member having a flexible antenna assembly electrically connected to the connector wherein the flexible antenna assembly comprises a flexible substrate with a flexible circuit laminated therewith;
a flexible housing attached to the mounting member and extending around the flexible antenna assembly; and
a light conducting element extending from an opening in the mounting member to a light emitting opening in a distal end of the flexible housing.

2. A card radio system comprising:
a card radio having an electrical connector and a latch-receiving opening at a distal end; and
a removable planar antenna having an electrical connector removably connectable with the electrical connector on the distal end of the card radio and an actuable latch releasably mateable with the latch-receiving opening wherein the actuable latch comprises;
a lever with a first end having a hook thereon and a second end opposite the first end, the lever being pivotally connected to the mounting member at a location closer to the first end of the lever than the second end of the lever.

3. A card radio system comprising:
a card radio having an electrical connector and a latch-receiving opening at a distal end;
a removable planar antenna having an electrical connector removably connectable with the electrical connector on the distal end of the card radio and an actuable lever latch releasably mateable with the latch-receiving opening; and
a tethered antenna having a base, an elongated antenna extending from the base, a cable electrically connected to the elongated antenna and extending from a bottom of the base, the cable having an electrical connector at its distal end removably connectable with the electrical connector at the distal end of the card radio.

4. A card radio system comprising:
a card radio having an electrical connector and a latch-receiving opening at a distal end; and
a removable planar antenna having an electrical connector removably connectable with the electrical connector on the distal end of the card radio and an actuable latch releasably mateable with the latch-receiving opening;
a tethered antenna having a base an elongated antenna extending from the base, a cable electrically connected to the elongated antenna and extending from a bottom of the base, the cable having an electrical connector at its distal end removably connectable with the electrical connector at the distal end of the card radio;
a first dove-tail mating element attachable to a mobile computer; and
a second dove-tail mating element attached to the base of the elongated antenna, the second dove-tail mating element removably mateable with the first dove-tail mating element.

5. A card radio system comprising:
a card radio having an electrical connector and a latch-receiving opening at a distal end; and
a removable planar antenna having an electrical connector removably connectable with the electrical connector on the distal end of the card radio and an actuable latch releasably mateable with the latch-receiving opening;
a tethered antenna having a base an elongated antenna extending from the base, a cable electrically connected to the elongated antenna and extending from a bottom of the base, the cable having an electrical connector at its distal end removably connectable with the electrical connector at the distal end of the card radio;
a semi-circular dove-tail mating element attachable to a mobile computer; and
a circular dove-tail mating element attached to the base of the elongated antenna, the circular dove-tail mating element removably mateable with the semi-circular dove-tail mating element and rotatable therein.

6. A card radio system comprising:

a card radio having an electrical connector and a latch-receiving opening at a distal end; and a removable planar antenna having an electrical connector removably connectable with the electrical connector on the distal end of the card radio and an actuable latch releasably mateable with the latch-receiving opening;

a tethered antenna having a base an elongated antenna extending from the base, a cable electrically connected to the elongated antenna and extending from a bottom of the base, the cable having an electrical connector at its distal end removably connectable with the electrical connector at the distal end of the card radio;

a semi-circular dove-tail mating element attachable to a mobile computer and having at least one indentation in a first surface thereof; and a circular dove-tail mating element attached to the base of the elongated antenna, the circular dove-tail mating element removably mateable with the semi-circular dove-tail mating element and rotatable therein, the circular dove-tail mating element having at least one indexing element extending outward therefrom for being received in the at least one indentation.

7. The card radio system of claim 6 further comprising:

a plurality of indentations and a plurality of indexing elements whereby the circular dove-tail mating element and the elongated antenna are rotatable to and retainable in a desired position.

8. An antenna for use with a card radio, comprising:

a mounting member having at least one actuable latch to releasably connect the antenna to the card radio;

an electrical connector extending through the mounting member;

a planar antenna assembly attached to the mounting member and electrically connected to the electrical connector;

a flexible planar antenna assembly;

a flexible housing attached to the mounting member and extending around the planar antenna assembly; and a light conducting element extending from an opening in the mounting member to a light emitting opening in a distal end of the flexible housing.

9. The antenna of claim 8 further comprising:

a second actuable latch on the mounting member, each of the latches having a release lever extending through a first surface of the flexible housing for releasing each of the latches from the card radio.

10. The antenna of claim 9 further comprising:

at least two guide members on the mounting member spaced from and corresponding to the actuable latches.

11. An antenna for use with a card radio, comprising:

a mounting member having at least one actuable latch to releasably connect the antenna to the card radio;

an electrical connector extending through the mounting member;

a planar antenna assembly attached to the mounting member and electrically connected to the electrical connector wherein at least one actuable latch comprises a lever with a first end having a hook thereon and a second end opposite the first end, the lever being pivotally connected to the mounting member at a location closer to the first end of the lever than the second end of the lever.

12. A tethered antenna system for use with a card radio, comprising:

a mounting plate for attaching to a mobile computer; and a tethered antenna having a base removeably attachable and rotatable in the mounting plate, an elongated antenna element extending from the base, and a cable in electrical communication with the elongated antenna element and extending from a bottom of the base, the cable having an electrical connector at a distal end removably connectable with the electrical connector on the distal end of the card radio.

13. A tethered antenna system for use with a card radio, comprising:

a mounting plate for attaching to a mobile computer;

a tethered antenna having a base removeably attachable and rotatable in the mounting plate, an elongated antenna element extending from the base, and a cable in electrical communication with the elongated antenna element and extending from a bottom of the base, the cable having an electrical connector at a distal end removably connectable with the electrical connector on the distal end of the card radio;

a semi-circular dove-tail mating element on the mounting plate and having at least one indentation in a first surface thereof; and a circular dove-tail mating element attached to the base of the tethered antenna, the circular dove-tail mating element removeably mateable with the semi-circular dove-tail mating element and rotatable therein, the circular dove-tail mating element having at least one indexing element extending outward therefrom for being received in the at least one indentation.

14. The tethered antenna system of claim 13 further comprising:

a plurality of indentations and a plurality of indexing elements whereby the circular dove-tail mating element and the elongated antenna are rotatable to and retainable in a desired position.

15. A card radio for use with any of a variety of removable antennae which are connectable with the card radio, comprising:

a frame assembly having an RF electrical connector which conducts a signal to be radiated by any of the variety of removable antennae and receives a signal collected by any of the variety of removable antennae, and an opening in the frame assembly at a distal end which receives a portion of any of the variety of removable antennae wherein the first opening is adjacent an upper edge of a frame in a first portion of the frame spaced to one side of the RF electrical connector and the card radio further comprises a second opening spaced from the first opening and being adjacent to a lower edge of the frame on the same side of the RF electrical connector as the first opening a third opening located in a second portion of the frame spaced to the other side of the RF electrical connector and being adjacent the upper edge of the frame, and a fourth opening spaced from the third opening and being adjacent to the lower edge of the frame on the same side of the RF electrical connector as the third opening.

16. A card radio for use with any of a variety of removable antennae which are connectable with the card radio, comprising:

a frame assembly having an RF electrical connector which conducts a signal to be radiated by any of the variety of removable antennae and receives a signal collected by any of the variety of removable antennae, an opening in the frame assembly at a distal end which receives a portion of any of the variety of removable antennae and at least one light emitting element in the frame assembly.

17. The card radio system of claim 3 wherein the card radio further has a second latch-receiving opening at the distal end and the planar antenna has a second actuable latch removably mateable with the second latch-receiving opening.

18. The card radio system of claim 3 wherein the planar antenna comprises a flexible antenna assembly.

19. The card radio system of claim 18 wherein the flexible antenna assembly comprises a flexible substrate with a flexible circuit laminated therewith.

* * * * *